United States Patent
Miao et al.

(10) Patent No.: US 7,885,335 B2
(45) Date of Patent: Feb. 8, 2011

(54) VARIABLE SHAPE MOTION ESTIMATION IN VIDEO SEQUENCE

(75) Inventors: Zhourong Miao, San Jose, CA (US); James J. Carrig, San Jose, CA (US); Marco Paniconi, Campbell, CA (US)

(73) Assignees: Sont Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1545 days.

(21) Appl. No.: 11/229,387

(22) Filed: Sep. 16, 2005

(65) Prior Publication Data

US 2007/0064810 A1 Mar. 22, 2007

(51) Int. Cl.
*H04N 11/04* (2006.01)
*H04N 7/12* (2006.01)

(52) U.S. Cl. ............... 375/240.24; 375/240.26; 375/E7.122; 375/E7.136; 375/E7.164; 375/E7.176

(58) Field of Classification Search ............ 375/240.24, 375/240.26, E7.122, E7.13, E7.136, E7.164, 375/E7.176
See application file for complete search history.

(56) References Cited

U.S. PATENT DOCUMENTS

| | | | |
|---|---|---|---|
| 4,922,341 A | 5/1990 | Strobach | |
| 5,047,850 A | 9/1991 | Ishii et al. | |
| 5,654,771 A | 8/1997 | Tekalp | |
| 5,872,866 A | 2/1999 | Strongin et al. | |
| 5,974,188 A | 10/1999 | Ibenthal | |
| 6,084,908 A | 7/2000 | Chiang et al. | |
| 6,178,205 B1 | 1/2001 | Cheung et al. | |
| 6,208,692 B1 | 3/2001 | Song et al. | |
| 6,212,235 B1 | 4/2001 | Nieweglowski et al. | |
| 6,466,624 B1 | 10/2002 | Fogg | |
| 6,480,615 B1 | 11/2002 | Sun et al. | |
| 6,590,934 B1 | 7/2003 | Kim | |
| 6,591,015 B1 | 7/2003 | Yasunari et al. | |
| 6,608,865 B1 | 8/2003 | Itoh | |
| 6,690,729 B2 | 2/2004 | Hayashi | |
| 6,754,269 B1 | 6/2004 | Yamaguchi et al. | |

(Continued)

FOREIGN PATENT DOCUMENTS

WO WO 00/16563 A1 3/2000

(Continued)

OTHER PUBLICATIONS

Leymarie et al, Tracking Deformable Objects in the Plane Using an Active Contour Model, IEEE Trans. on Pattern Analysis and Mach. Intel., vol. 15 No. 6, Jun. 1993, pp. 617-634.

(Continued)

*Primary Examiner*—Bhavesh M Mehta
*Assistant Examiner*—Stephen R Koziol
(74) *Attorney, Agent, or Firm*—Blakely, Sokoloff, Taylor & Zafman LLP (57) ABSTRACT

A method of creating a variable-shaped block in a target image includes generating an initial pattern of target blocks, identifying allowable combinations of target blocks, calculating a combination value for each allowable combination, using the combination value to select one of the allowable combinations, and performing the selected allowable combination to create a variable-shaped block.

15 Claims, 6 Drawing Sheets

U.S. PATENT DOCUMENTS

| | | | |
|---|---|---|---|
| 6,765,965 | B1 | 7/2004 | Hanami et al. |
| 6,782,054 | B2 | 8/2004 | Bellers |
| 6,864,994 | B1 | 3/2005 | Harrington |
| 2004/0057517 | A1 | 3/2004 | Wells |
| 2004/0062307 | A1 | 4/2004 | Hallapuro et al. |
| 2004/0131267 | A1 | 7/2004 | Adiletta et al. |
| 2004/0146107 | A1* | 7/2004 | Sekiguchi et al. ...... 375/240.14 |
| 2004/0233991 | A1 | 11/2004 | Sugimoto et al. |
| 2005/0100092 | A1* | 5/2005 | Sekiguchi et al. ...... 375/240.12 |
| 2005/0111548 | A1* | 5/2005 | Lee et al. ............... 375/240.12 |
| 2005/0114093 | A1 | 5/2005 | Cha et al. |
| 2005/0135483 | A1 | 6/2005 | Nair |

FOREIGN PATENT DOCUMENTS

| | | |
|---|---|---|
| WO | WO 01/78402 A1 | 10/2001 |
| WO | WO 02/37859 A2 | 5/2002 |
| WO | WO 2004/047454 A1 | 6/2004 |
| WO | WO 2005/069629 A1 | 7/2005 |

OTHER PUBLICATIONS

Reshef et al, Low Bit-Rate Video Coding Using Iterave Affine Motion Estimation and Quadtree Segmentation, Proc. Int'l Conf. on Dig. Signal Processing, Jun. 1995 pp. 427-431.

Chang et al, Simultaneous Motion Estimation and Segmentation, IEEE Transactions on Image Processing, vol. 6 No. 9, Sep. 1997, pp. 1326-1333.

Zhang et al, Image Sequence Segmentation Using 3-D Structure Tensor and Curve Evolution, IEEE Trans. on Circuits and Sys. For Video Tech., vol. 11 No. 5, May 2001, pp. 629-640.

Orchard et al, Overlapped Block Motion Compensation: An Estimation—Theoretic Approach, IEEE Transactions on Image Processing, vol. 3 No. 5, Sep. 1994, pp. 693-699.

Du et al, Two Dimensional Hierarchical Mesh Based Video Compression Techniques, 6th Int'l Symposium on DSP for Communication Systems, 2002, Sydney Australia, pp. 247-252.

* cited by examiner

VARIABLE SHAPE MOTION ESTIMATION IN VIDEO SEQUENCE

FIELD OF THE INVENTION

The invention is related to the field of video compression.

BACKGROUND

High compression gains for video sequences can be achieved by removing temporal redundancies between images (frames). For example, to encode an image, a temporal prediction of the image to be encoded is generated based on previously encoded images. The temporal prediction is compared with the actual image to determine the prediction error, and the prediction error is encoded. The prediction can be made using block-based motion estimation and compensation methods, which are widely used (e.g., MPEG standards).

Motion compensation and estimation methods are used to find a reference block in one or more reference images to predict the location of a corresponding target block in the target image, so that only the prediction residual of the target block needs to be coded, which is typically the prediction error and motion vector. These methods perform block matching to identify a reference block of pixels in the reference image that is most similar to a corresponding target block in the target image.

Figure 1:
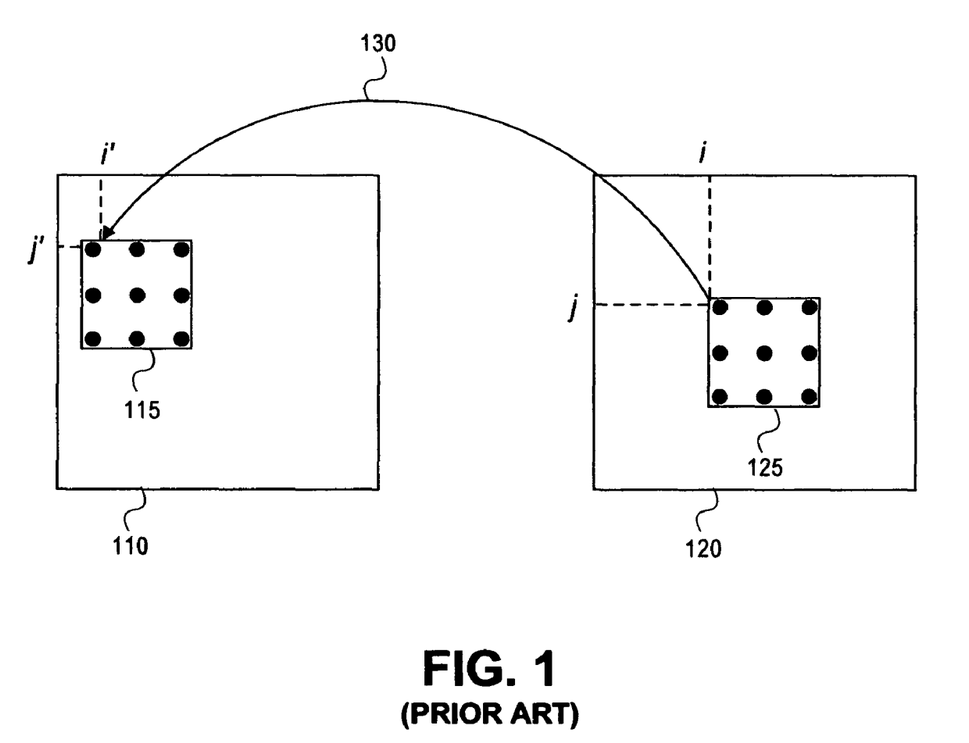
FIG. 1 is a diagrammatic view of an illustrative motion vector, reference block, and target block.

FIG. 1 is a diagrammatic view of an illustrative motion vector, reference block, and target block. Target image 120 is to be encoded using information from reference image 110. Reference block 115 is identified as the block in reference image 110 that most closely matches a target block 125 in target image 120. After the reference block is identified, motion vector 130 (shown as an arrow for illustrative purposes only) is generated to identify the position of target block 125 relative to the position of reference block 115. Motion vector 130 has two elements that represent the relationship between reference block 115 and target block 125: a horizontal displacement and a vertical displacement. For example, reference block 115, which is an illustrative 3×3 group of pixels, is at location (i', j'), and target block 125 is at location (i, j). The distance between the two blocks is the motion vector (i'-i, j'-j).

The values of the motion vector are used in video compression, along with the reference block, to generate a prediction value for the target block. For example, if a target block S is associated with a motion vector and corresponding reference block, then each pixel in the target block is predicted as:

$$\hat{v}(x,y,t) = v(x+mx, y+my, k), \text{ for all } v(x,y,t) \in S, \quad (1)$$

where $\hat{v}(x,y,t)$ is the predicted pixel value in the target block, located at pixel coordinate (x,y), t is the time index of the target image, v(x+mv,y+my,k) is the pixel value in the reference block (indexed by k), and [mx,my] is the motion vector to represent the offset of the pixel in the reference block relative to the location of the pixel to be predicted in the target block.

To predict an entire target image, a typical method divides the target image into several non-overlapping target blocks. Then, motion estimation is performed for each target block to determine its corresponding reference block and motion vector. In general, the target and reference blocks created by the motion estimation process have the same shape and contain the same amount of pixels, so that there is a one to one mapping between each target and reference pixel.

One example of a method for creating target blocks can be found in MPEG, which divides the target image into target blocks having a fixed amount of pixels (i.e., 16×16 pixels). More advanced video codecs allow the shapes and sizes of the target blocks to vary (with some limitations). For example, MPEG/AVC allows the block size to vary from 4×4 up to 16×16 pixels.

In general, traditional block creation methods work well when creating a regular pattern of fixed-size target and reference blocks. Motion estimation methods, on the other hand, have better prediction performance when the target and reference blocks have variable shapes and sizes. However, creating an efficient pattern of target blocks that vary in size and shape is beyond the capabilities of traditional block creation methods. There is a need for a method that efficiently creates variable shaped blocks in the target image to be used by a motion estimation method.

SUMMARY

A method of creating a variable-shaped block in a target image includes generating an initial pattern of target blocks, identifying allowable combinations of target blocks, calculating a combination value for each allowable combination, using the combination value to select one of the allowable combinations, and performing the selected allowable combination to create a variable-shaped block.

BRIEF DESCRIPTION OF THE DRAWINGS

The present invention is illustrated by way of example and may be better understood by referring to the following description in conjunction with the accompanying drawings, in which.

DETAILED DESCRIPTION

In the following description, reference is made to the accompanying drawings which form a part hereof, and in which is shown by way of illustration a specific embodiment in which the invention may be practiced. It is to be understood that other embodiments may be utilized and structural changes may be made without departing from the scope of the present invention. For example, skilled artisans will understand that the term image that is used to describe the various embodiments is generally interchangeable with the terms field, frame, or picture as used with reference to video data.

A method creates a pattern of variable-shaped target blocks for use in motion estimation. The method receives a target image and a reference image, divides the target image into target blocks of various shapes and sizes, and generates a motion vector for each variable-shaped target block. In one embodiment, the method creates the variable-shaped blocks by iteratively and adaptively combining smaller blocks into larger ones.

The method can start with any initial pattern of target blocks, such as a regular pattern of target blocks, each containing 2×2 pixels, for example. The method identifies allowable combinations of smaller blocks that can form a larger block. For each allowable combination, a value that reflects its cost and benefit is determined. A cost of the combination is an increase in a prediction error, and a benefit is a reduced number of motion vectors for the larger block. After an allowable combination with an acceptable value is identified, the associated smaller blocks are combined to form a larger block, and a new motion vector for the larger block is determined. The method can be repeated until a desired stopping point is reached. For example, in one embodiment, the method continues until the number of blocks in the target image falls below a given number.

Figure 2:
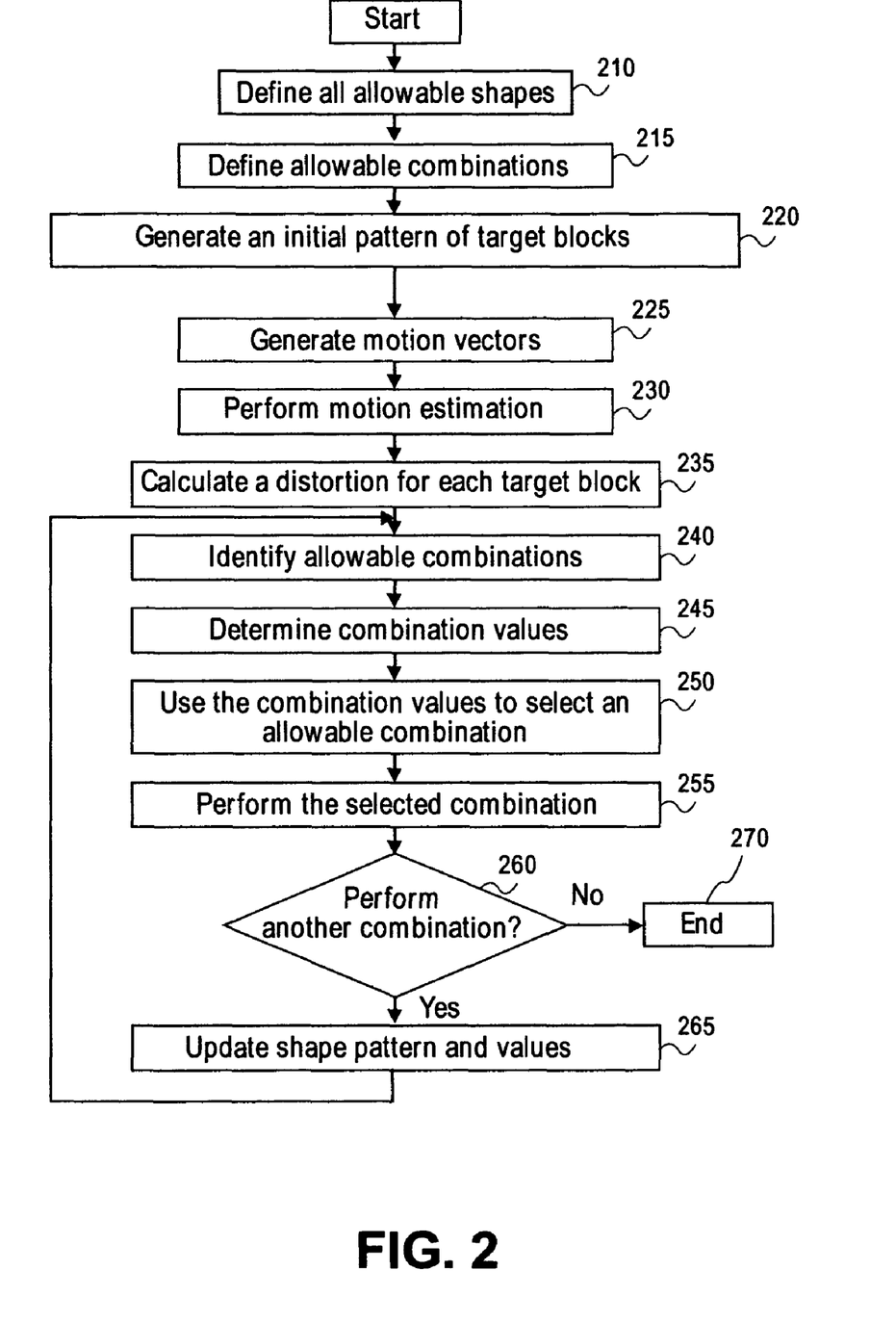
FIG. 2 is an example of a method for creating variable-shaped blocks for motion estimation.

An example of a method for creating variable-shaped blocks is shown in FIG. 2. At 210, allowable shapes for the target blocks are defined. In general, the method can start with an initial pattern of blocks having any shape, and can perform any combination of blocks to create an output pattern with arbitrarily shaped blocks. The more shapes that are created by the method, the better the performance of the motion estimation is. However, the complexity of performing the method increases as the number of shapes increases. In order to perform the method with a reasonable degree of complexity, some embodiments use a predetermined number of allowable shapes and a predetermined number of allowable combinations.

Figure 3A:
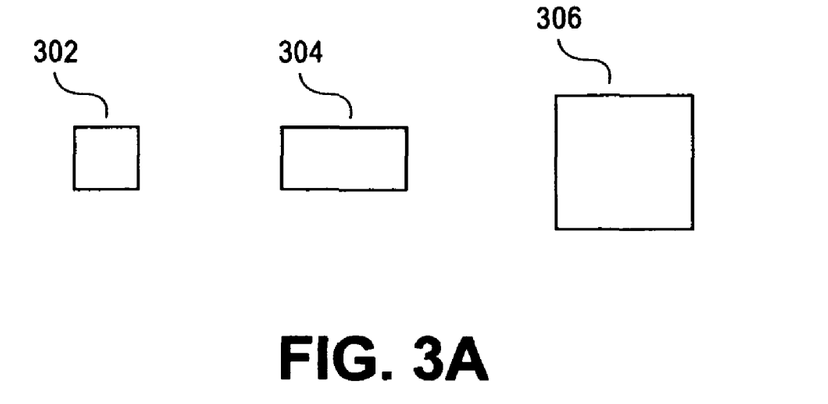
FIGS. 3A, 3B, 3C, and 3D show examples of allowable shapes and combinations of shapes used by the method for creating variable-shaped blocks for motion estimation.

In this example, in order to reduce the complexity, a set of simple shapes, e.g., rectangular blocks, are defined at 210, so that the smaller shapes can be combined into a larger shape without performing an excessive number of computations. Examples of allowable shapes that are defined at 210 are shown in FIG. 3A, including a 2×2 block of pixels 302, a 2×4 block 304, and a 4×4 block 306.

At 215, the allowable combinations of smaller blocks into a larger block are defined. Some exemplary definitions of the allowable combinations include: (1) only existing (smaller) shapes that are connected to each other can be combined into a single larger shape, (2) the larger shape is an existing predefined shape, and (3) the larger shape is located in an allowable location within the target image. These definitions greatly reduce the number of allowable combinations in the entire picture, thus reducing the complexity of creating the variable-shaped blocks. The definitions can be set by the system or chosen by a user so that the number of allowable combinations is large enough to adequately perform motion estimation, and small enough to reduce the complexity of creating the variable-shaped blocks to a manageable degree.

Figure 3B:
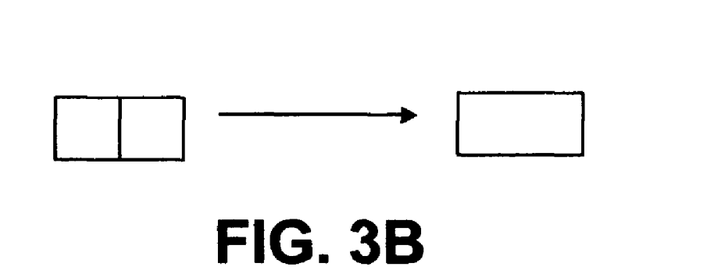
Figure 3C:
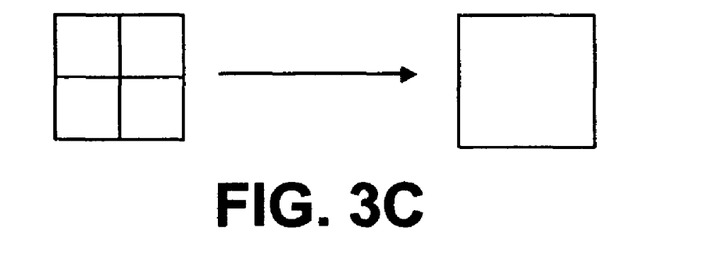
Figure 3D:
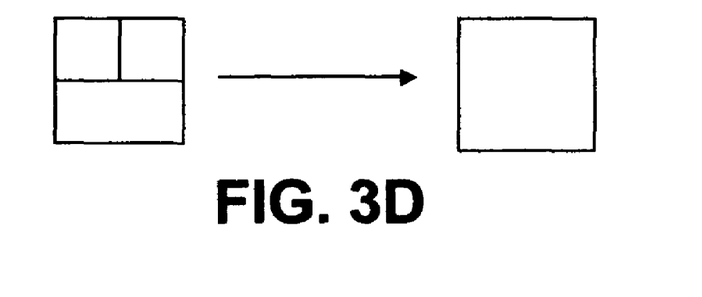

Examples of allowable combinations of smaller blocks into a larger block are shown in FIGS. 3B, 3C, and 3D. In FIG. 3B, a block of 2×2 pixels is allowed to be combined with another block of 2×2 pixels, to form a larger block of 2×4 pixels. In FIG. 3C, four blocks of 2×2 pixels are allowed to be combined into a larger block of 4×4 pixels. In FIG. 3D, two blocks of 2×2 pixels and one block of 2×4 pixels are allowed to be combined into a larger block of 4×4 pixels.

Figure 4:
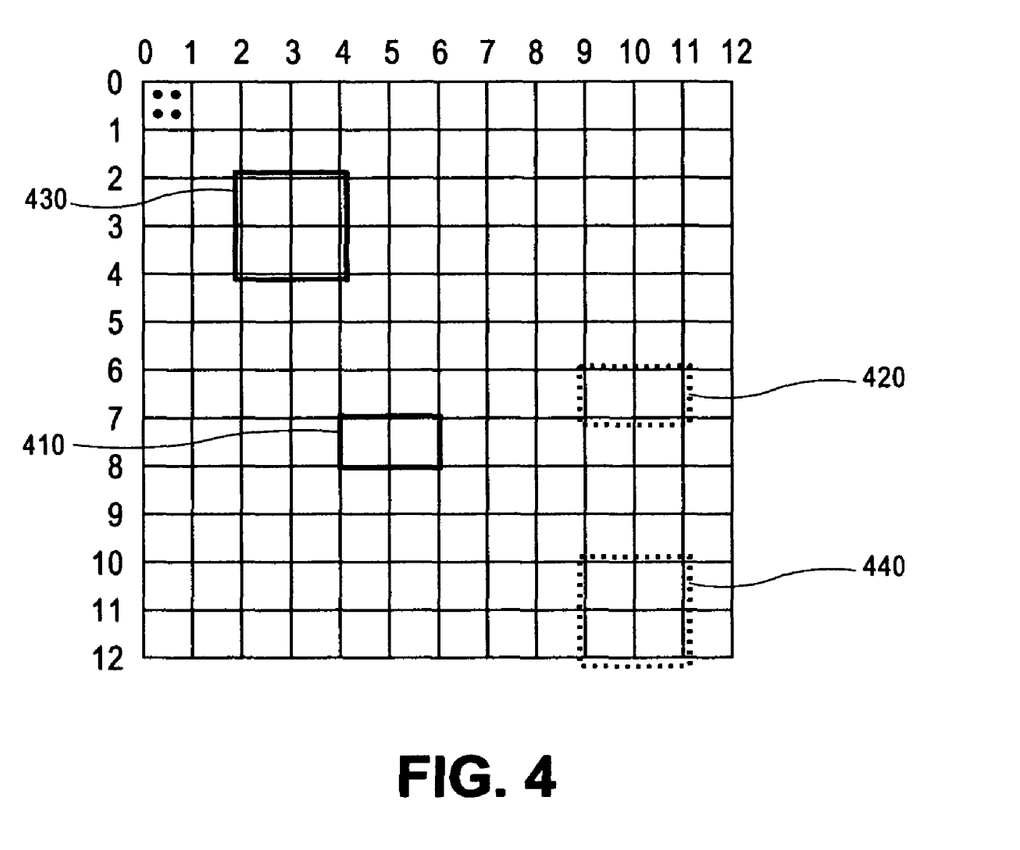
FIG. 4 shows an example of allowable locations for allowable combinations of blocks used by the method for creating variable-shaped blocks for motion estimation.

The definition of an allowable combination can also include allowable locations for the combination. For instance, a block with a 2×4 shape can be allowed at a particular location if a selected pixel in the block is located at a y-coordinate that is a multiple of 2, or an x-coordinate that is a multiple of 4 (e.g., y=0, 2, 4, ... or x=0, 4, 8, ...). An example of allowable and forbidden locations for a combined block is shown in FIG. 4. The combination of smaller blocks into larger block 410 is allowable, because the location of the larger block has an x-coordinate of 4, which is. a multiple of 2. The combination to form block 420, on the other hand, is forbidden, because the x-coordinate of block 420 is 9, which is not a multiple of 2.

As another example, a user can allow a 4×4 block to be created if its selected pixel is located at x and y coordinates that are multiples of 2 (e.g., y=0, 2, 4, 8 . . . and x=0, 2, 4, 8 . . . ). In FIG. 4, block 430 is allowed to be created, because the selected pixel has an x-coordinate of 2 and a y coordinate of 2. Block 440 is forbidden, even though its y-coordinate is a multiple of 2, because its x-coordinate is 9. As shown by these examples of predefined allowable locations, not all 2×2 blocks can be combined to create a 2×4 or a 4×4 block. The number of allowable positions balances motion estimation performance and computational complexity.

At 220, an initial pattern of target blocks for the entire target image is generated. In this example, the initial pattern is generated using the allowable shapes defined at 210. The initial pattern that is generated can be a regular pattern of fixed-size small blocks (e.g., 2×2 blocks). After the initial pattern is generated, a motion vector is determined for each target block at 225. Many existing algorithms can be used to find the motion vectors (e.g., in MPEG). The initial number of blocks, $N_{block}$, and the initial number of motion vectors, $N_{mv}$, are recorded.

At 230, motion estimation is performed for each block using the motion vector generate a prediction of the target block, and an associated prediction error. At 235, the prediction error is used to calculate a distortion $D_S$ of the motion compensated prediction of the target block. The distortion is a measurement of the prediction performance of the target block. Different functions can be used to determine the distortion. One example is the sum of the square of the pixel prediction error:

$$D_S = \sum_{x,y \in S} (\hat{v}_{x,y} - v_{x,y})^2, \qquad (2)$$

where x,y∈S denotes all the pixels in the target block S, $v_{x,y}$ is the original pixel value in the target picture, and $\hat{v}_{x,y}$ is the predicted value of the target pixel. The predicted value is determined by using the motion vector to identify a pixel in a reference image.

Another example of a distortion function is the sum of the absolute value of the prediction error:

$$D_S = \sum_{x,y \in S} |\hat{v}_{x,y} - v_{x,y}|. \qquad (3)$$

Either of these functions, or another function, can be selected by a user to measure the distortion of a target block.

At 240, the definitions of allowable combinations are used to identify the allowable combinations of existing blocks in the target image. The motion vector of each larger block that could be formed from an allowable combination is also determined. Motion estimation methods known to those of skill in the art may be used to determine the motion vectors.

At 245, a combination value is determined for each allowable combination. If the allowable combination is performed, the result is an increase in distortion but a decrease in the number of motion vectors. Thus, although the distortion is increased by combining smaller blocks into a larger block, the motion vectors that are no longer needed for the smaller blocks become available for use by the motion estimation method. This could result in an overall decrease in the distortion of the predicted target image. To determine whether the allowable combination should be performed, the cost of performing the combination is weighed against the benefit. This cost versus benefit can be expressed as a function of the increased distortion and reduced number of motion vectors. An example of a function to weigh the cost of the combination against the benefit is the ratio:

$$M = \Delta D / \Delta R. \quad (4)$$

where M is the combination value. The combination value is used to compare multiple allowable combinations of blocks in a particular region of the target image.

The increase in distortion is calculated by subtracting the total distortion of the smaller blocks in the allowable combination from the distortion of the resulting larger block to determine the distortion difference, $\Delta D$. The total distortion of the smaller shapes, $D_0$, is the sum of the prediction distortion $D_S$ of the smaller shapes in the allowable combination. The distortion of each smaller shape is calculated using a distortion function such as eq. (2) or eq. (3). The total distortion of the smaller blocks is:

$$D_0 = \sum_{S \in S_L} D_S, \quad (5)$$

where $S \in S_L$ denotes all of the smaller blocks in the allowable combination. The distortion after the combination, $D_1$, is the distortion of the larger block created by combining the smaller blocks. Generally, the amount of distortion for the larger block is greater than that of the smaller blocks. The increased distortion caused by the combination is:

$$\Delta D = D_1 - D_0. \quad (6)$$

The reduction in the number motion vectors resulting from the combination, $\Delta R$, is determined by subtracting the number of motion vectors in the larger block created by the combination, $R_1$, from the number of motion vectors in the smaller blocks that exist before the combination, $R_0$. (If a single reference image is used, the number of motion vectors in each block is 1). The reduction in the amount of motion vectors resulting from the combination is:

$$\Delta R = R_1 - R_0. \quad (7)$$

After calculating the increase in distortion $\Delta D$ and the decrease in motion vectors $\Delta R$, the combination value is determined using eq. (4).

At 250, the combination value is used to select an allowable combination to be performed. In one embodiment, the combination value for a particular allowable combination is compared with the values of other allowable combinations in particular region of the target image. The allowable combination having the smallest combination value is then selected.

At 255, the selected combination is performed. The smaller blocks of the selected combination are replaced with the larger block. Also, the motion vectors of the smaller blocks are replaced with the motion vector associated with the larger block.

At 260, the method decides whether to perform another combination. Examples of functions that can be used to decide whether to perform another combination include a fixed stopping function and an adaptive stopping function.

The fixed stopping function stops the method after the number of blocks in the target image is less than or equal to a threshold number, $Th_{block}$. For example, for an image with a size of 720×480 (720 vertical lines and 480 horizontal lines), the user can set a maximum number of blocks for the target image to be 1350, i.e., $Th_{block}$=1350. The threshold number of shapes can be set by the encoder or specified by the user as an input parameter. Alternatively, the fixed stopping function stops the method after the number motion vectors in the target image is less than or equal to a threshold number, $Th_{mv}$. (If a single reference image is used to predict the target image, the number of target shapes is equal to the number of motion vectors in the target image ($Th_{block}$=$Th_{mv}$)). After each iteration, the remaining number of shapes ($N_{block}$) or number of motion vectors ($N_{mv}$) is recorded. When the encoder detects that the $N_{block} \leq Th_{block}$ (or $N_{mv} \leq Th_{mv}$), it stops the method.

Another stopping function uses a threshold, $Th_{stop}$, to stop the method when the benefit of performing another combination is negligible. For example, when the combination value of the current selected allowable combination exceeds the threshold value $Th_{stop}$, the method stops. In this way, the number of shapes and motion vectors in the target picture can be adapted to the content of the target image. This is useful when the images in the video stream have a large amount of temporal variation.

If another combination is to be performed, then, at 265, the shape pattern of the target picture is updated to reflect the most recent combination. Also, the values for the number of shapes and the number of motion vectors, $N_{block}$ and $N_{mv}$, are updated to reflect the changes produced by the combination. Then, the method returns to 240.

If no more combinations are to be performed, the method ends at 270.

Figure 5:
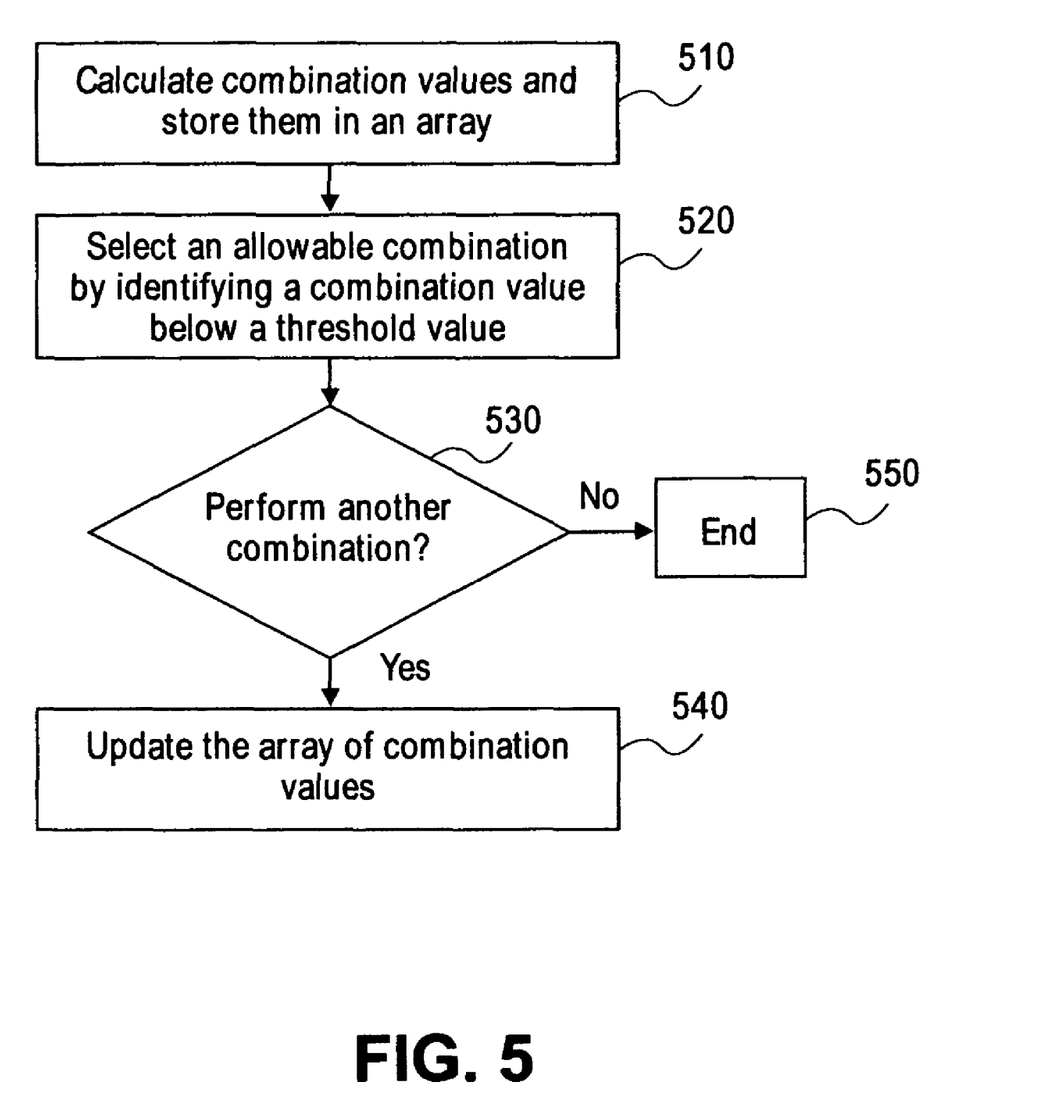
FIG. 5 is another example of a method for creating variable-shaped blocks for motion estimation.

Another example of a method to create variable-shaped blocks is shown in FIG. 5, which replaces several calculations of the method of FIG. 2 with simpler functions. For example, during each iteration of the method illustrated in FIG. 2, the combination value is calculated for all allowable combinations. However, many allowable combinations in a particular iteration were present in the previous iteration, therefore, their combination values were calculated during the previous iteration. The amount of calculations performed for the current iteration can be reduced by reusing the previously calculated values.

The method of FIG. 5 reuses previously calculated ratios when creating variable shapes for motion estimation, and updates and stores changes to any values that occur in the current iteration of the method. At 510, during the first iteration, the method calculates the values of M for the allowable combinations, and stores the values in a multi-dimension array in a computer readable medium, such as an electronic memory device for example. In the array, the values of M are indexed as $M_{l,x,y}$. The definitions of l, x, and y used in the index are given in Table 1.

TABLE 1

Index description of M values.

| Index symbol | Range | Description |
|---|---|---|
| l | [1, $N_L$] | The allowable shape index. |
| x | Allowable pixel positions (in x – axis, horizontal) for shape l | The allowable shape position index (in the target picture). |

TABLE 1-continued

Index description of M values.

| Index symbol | Range | Description |
|---|---|---|
| y | Allowable pixel positions (in y – axis, vertical) for shape 1 | The allowable shape position index (in the target picture). |

The complexity of the method of FIG. 2 can be further reduced by comparing the combination value of a particular allowable combination to a threshold value, instead of several other values, to determine whether to perform the combination. For example, in the method of FIG. 2, the combination having the minimum value of $M=\Delta D/\Delta R$ is selected. However, identifying the minimum value requires the method to scan through all of the allowable combinations. Instead of scanning through all combination, the method of FIG. 5 at 520 compares the combination value for a particular allowable combination to a predetermined threshold value, $Th_{merge}$. If $M<Th_{merge}$, then this combination is immediately selected and performed, and the other allowable combinations are ignored during this iteration. If the combination value is not less than the threshold, then the next combination value in the array is compared to the threshold. (The threshold $Th_{merge}$ is different from the threshold $Th_{stop}$ discussed above).

At 530, the method decides whether to perform another combination. If not, the process ends, 550. If so, the values of $M_{l,x,y}$ that are affected by this combination are updated at 540 and the process returns to 520. As a result, after the first iteration, only a fraction of the M values in the array are re-calculated, and the rest of M values remain unchanged. This reduces the complexity and decreases the processing time of the method.

After the variable-shape block creation method is performed, the information to reconstruct the pattern of variable-shaped blocks, as well as motion vectors for the variable-shaped blocks, is sent to decoder for reconstruction. The pattern of variable-shaped blocks and motion vectors are used by the decoder to perform motion compensation for the target image.

Figure 6:
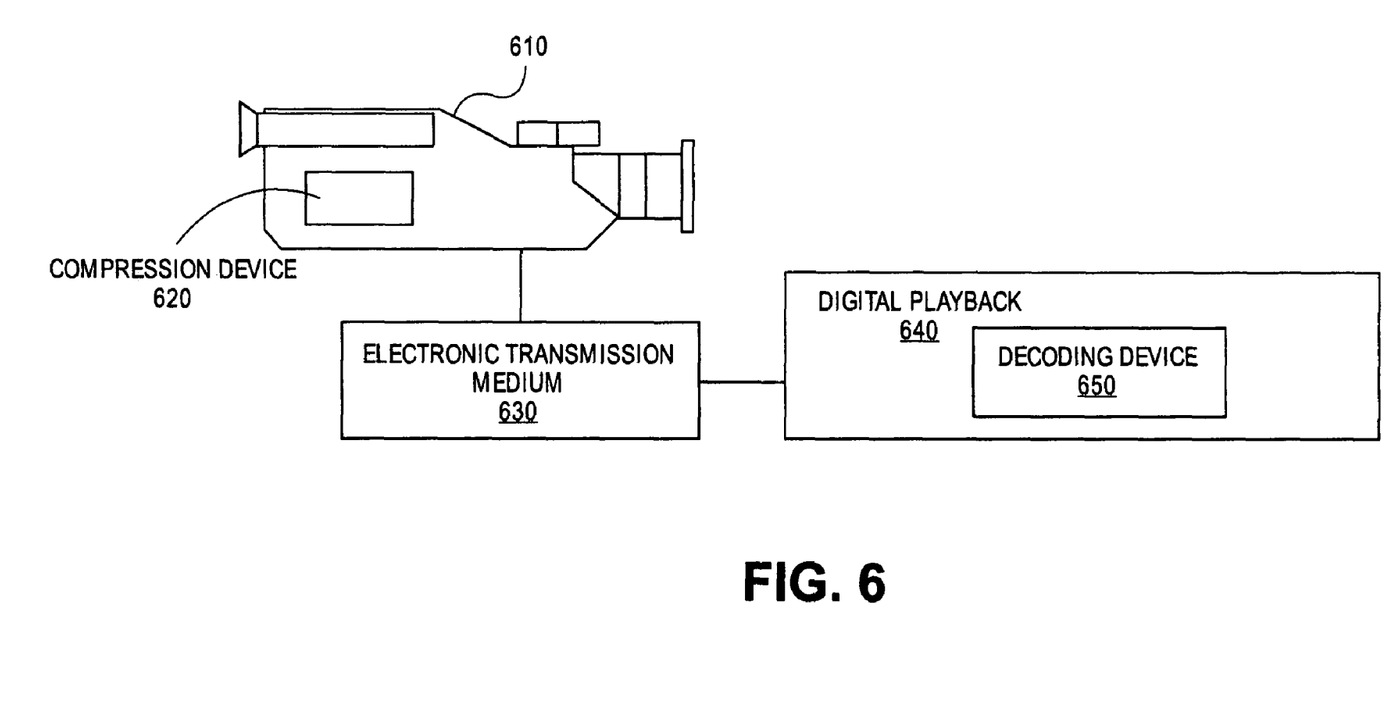
FIG. 6 shows an example of a system that uses the variable-shaped block creation method.

The method for creating a pattern of variable-shaped blocks can be applied in any video compression or any other application where motion estimation and motion compensation are performed. The method can work either independently or jointly with other methods related to motion prediction in video compression. FIG. 6 shows an example of a system that uses the variable-shaped block creation method. A digital video camera 610 captures images in an electronic form, and processes the images using compression device 620, which implements the variable-shaped block creation method during the compression and encoding process. The encoded images are sent over an electronic transmission medium 630 to digital playback device 640. The images are decoded by decoding device 650, which uses the method during the decoding process.

While the invention is described in terms of illustrative embodiments in a specific system environment, those of ordinary skill in the art will recognize that the invention can be practiced in various ways in other and different hardware and software environments within the spirit and scope of the appended claims.

The invention claimed is:

1. A method carried out by an electronic data processor comprising:
    generating an initial pattern of target blocks;
    identifying allowable combinations of target blocks;
    calculating a combination value for each allowable combination, wherein the combination value is the ratio between an increase in distortion if the combination is performed and a decrease in motion vectors if the combination is performed;
    iteratively comparing the combination value of each allowable combination to a merge threshold until one allowable combination with a combination value less than the merge threshold is identified, wherein subsequent allowable combinations are not iterated;
    selecting the identified allowable combination, and
    creating a variable-shaped block using the selected allowable combination.

2. The method of claim 1, further comprising:
    defining the allowable combinations using a set of combination rules.

3. The method of claim 1, wherein the combination value is calculated using:

$$M=\Delta D/\Delta R$$

where $\Delta D$ is an increase in distortion from the combination, $\Delta D$ is a decrease in motion vectors from the combination, and M is the combination value.

4. The method claim 1, further comprising:
    repeating the method until a number of variable-shaped blocks is less than a threshold value.

5. The method of claim 1, further comprising:
    repeating the method until a combination value of a selected allowable combination is less than a threshold value.

6. An apparatus comprising:
    a generator that generates an initial pattern of target blocks;
    an identifier that identifies allowable combinations of target blocks;
    a calculator that calculates a combination value for each allowable combination, wherein the combination value is the ratio between an increase in distortion if the combination is performed and a decrease in motion vectors if the combination is performed;
    a selector that iteratively compares the combination value of each allowable combination to a merge threshold until an allowable combination with a combination value less than the merge threshold is identified and selects the identified allowable combination, wherein subsequent allowable combinations after the selected allowable combination are not iterated; and
    a block creator that creates a variable-shaped block using the selected allowable combination.

7. The apparatus of claim 6, further comprising:
    a definer that uses the allowable combinations using a set of combination rules.

8. The apparatus of claim 6, wherein the combination value is calculated using:

$$M=\Delta D/\Delta R$$

where $\Delta D$ is an increase in distortion from the combination, $\Delta R$ is a decrease in motion vectors from the combination, and M is the combination value.

9. The apparatus of claim 6, further comprising:
    a repeater that repeats the method until a number of variable-shaped blocks is less than a threshold value.

10. The apparatus of claim 6, further comprising:
a repeater that repeats the method until a combination value of a selected allowable combination is less than a threshold value.

11. A non-transitory computer readable medium storing a program of instructions which, when executed by a processing system, cause the system to perform a method comprising:
generating an initial pattern of target blocks;
identifying allowable combinations of target blocks;
calculating a combination value for each allowable combination, wherein the combination value is the ratio between an increase in distortion if the combination is performed and a decrease in motion vectors if the combination is performed;
iteratively comparing the combination value of each allowable combination to a merge threshold until an allowable combination with a combination value less than the merge threshold is identified, wherein subsequent allowable combinations are not iterated;
selecting the identified allowable combination; and
creating a variable-shaped block using the selected allowable combination.

12. The non-transitory computer readable medium of claim 11, further comprising:
defining the allowable combination using a set of combination rules.

13. The non-transitory computer readable medium of claim 11, wherein the combination value is calculated using:

$$M = \Delta D | \Delta R$$

where $\Delta D$ is an increase in distortion from the combination, $\Delta R$ is a decrease in motion vectors from the combination, and M is the combination value.

14. The non-transitory computer readable medium of claim 11, further comprising:
repeating the method until a number of variable-shaped blocks is less than a threshold value.

15. The non-transitory computer readable medium of claim 11, further comprising:
repeating the method until a combination value of a selected allowable combination is less than a threshold value.

* * * * *